United States Patent
Inoue

(10) Patent No.: US 6,813,875 B2
(45) Date of Patent: Nov. 9, 2004

(54) CONTROL SYSTEM FOR GAS-TURBINE ENGINE

(75) Inventor: Tsutomu Inoue, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 798 days.

(21) Appl. No.: 09/754,367

(22) Filed: Jan. 5, 2001

(65) Prior Publication Data

US 2004/0011050 A1 Jan. 22, 2004

(30) Foreign Application Priority Data

| Jan. 7, 2000 | (JP) | 2000-002022 |
| Jan. 7, 2000 | (JP) | 2000-002023 |
| Jan. 7, 2000 | (JP) | 2000-002024 |

(51) Int. Cl.[7] ............... F02C 3/22; F02C 9/28
(52) U.S. Cl. ............... 60/39.281; 60/39.465
(58) Field of Search ............... 60/39.281, 39.465

(56) References Cited

U.S. PATENT DOCUMENTS

| 4,380,400 A | * | 4/1983 | Searle ............... 374/37 |
| 4,922,710 A | * | 5/1990 | Rowen et al. ............... 60/39.281 |
| 5,288,149 A | * | 2/1994 | Meyer ............... 374/36 |
| 5,609,016 A | * | 3/1997 | Yamada et al. ............... 60/39.281 |

FOREIGN PATENT DOCUMENTS

JP  1-163426  6/1989

* cited by examiner

Primary Examiner—Louis J. Casaregola
(74) Attorney, Agent, or Firm—Arent Fox PLLC

(57) ABSTRACT

A system for controlling a gas-turbine engine having a combustor which generates a combustion such that resulting combustion gas rotates a turbine that is connected to the compressor and a load such as a generator to drive the compressor and the generator. In the system, the oxygen concentration of the resulting combustion gas is detected and the adiabatic flame temperature is calculated based on at least the detected oxygen concentration such that the combustion mode is switched between the premix combustion and the diffusive combustion by calculated temperature. With this, the system, when operated using a gas fuel whose composition is not constant can control the fuel supply through a multiple venturi mixer, while avoiding flame-out and operate stably in response to load demand and achieving excellent emission performance. Further, the system can control the fuel supply without the need to detect the throat pressure of the multiple venturi mixer, even when suffered from the influence of the mixer outlet pressure and some similar factors.

9 Claims, 12 Drawing Sheets

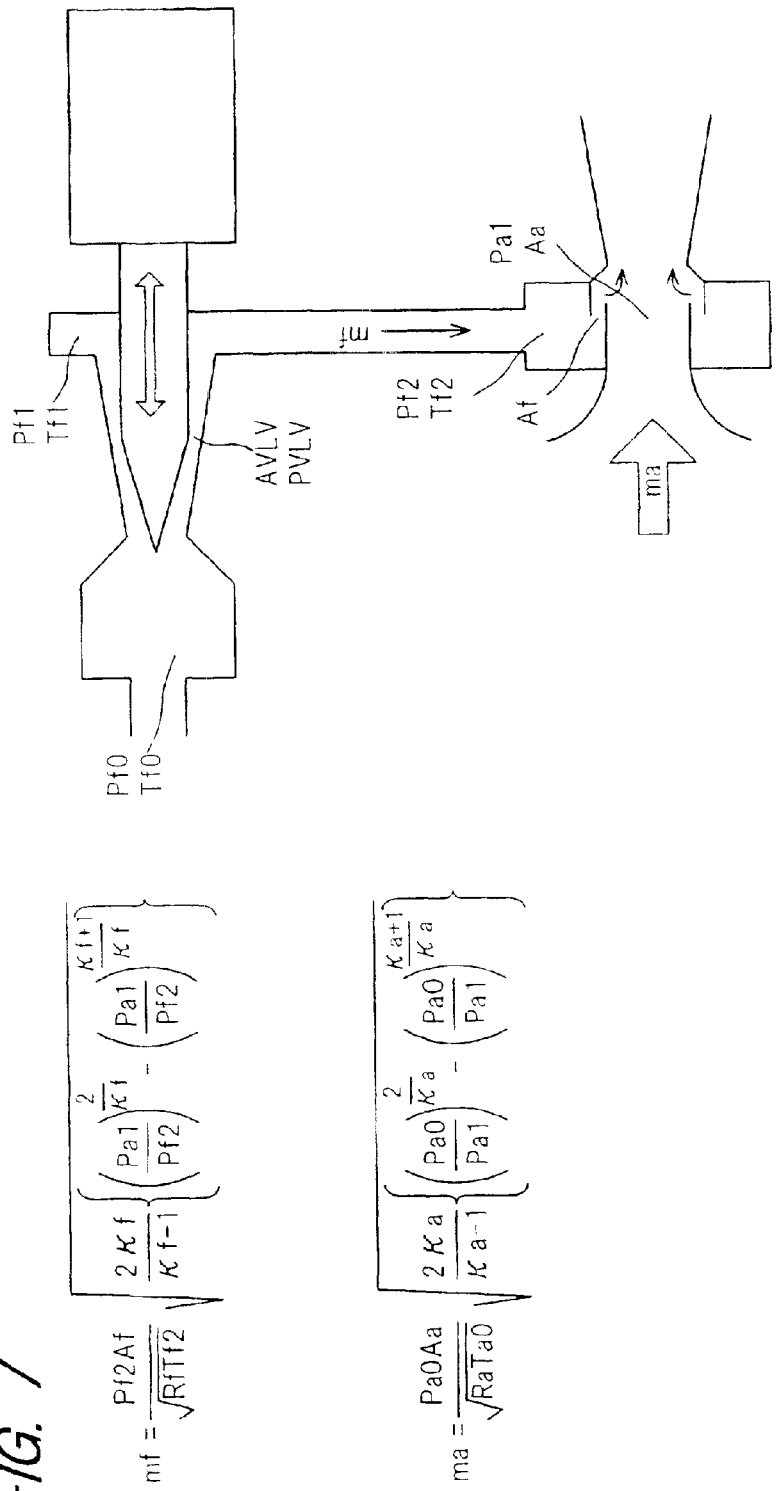

FIG. 7

$$mf = \frac{Pf2 Af}{\sqrt{Rt Tf2}} \sqrt{\frac{2 \kappa f}{\kappa f - 1} \left\{ \left(\frac{Pa1}{Pf2}\right)^{\frac{2}{\kappa f}} - \left(\frac{Pa1}{Pf2}\right)^{\frac{\kappa f + 1}{\kappa f}} \right\}}$$

$$ma = \frac{Pa0 Aa}{\sqrt{Ra Ta0}} \sqrt{\frac{2 \kappa a}{\kappa a - 1} \left\{ \left(\frac{Pa0}{Pa1}\right)^{\frac{2}{\kappa a}} - \left(\frac{Pa0}{Pa1}\right)^{\frac{\kappa a + 1}{\kappa a}} \right\}}$$

Pf0 : FUEL CONTROL VALVE INLET PRESSURE [Pa]
Pf2 : ORIFICE INLET PRESSURE [Pa]
PVLV : FUEL CONTROL VALVE THROAT PRESSURE [Pa]
Pa0 : VENTURI INLET AIR PRESSURE [Pa]
Pa1 : VENTURI THROAT PRESSURE [Pa]
Tf0 : FUEL CONTROL VALVE INLET TEMPERATURE [K]
Tf2 : ORIFICE INLET TEMPERATURE [K]
Ta0 : VENTURI INLET AIR TEMPERATURE [K]

mf : FUEL MASS FLOW RATE [kg/sec]
ma : AIR MASS FLOW RATE [kg/sec]
AVLV : FUEL CONTROL VALVE EFFECTIVE OPENING AREA [m²]
Af : ORIFICE INLET EFFECTIVE OPENING AREA [m²]
Aa : VENTURI THROAT EFFECTIVE OPENING AREA [m²]
Rf : FUEL GAS CONSTANT [kJ/kg K]
Ra : AIR GAS CONSTANT [kJ/kg K]
$\kappa f$ : FUEL GAS SPECIFIC HEAT
$\kappa a$ : AIR SPECIFIC HEAT

CONTROL SYSTEM FOR GAS-TURBINE ENGINE

BACKGROUND OF THE INVENTION

1. Field of the Invention

This invention relates to a control system for a gas-turbine engine, more specifically to a control system for a stationary gas-turbine engine.

2. Description of the Prior Art

A recent trend in gas-turbine engines, particularly stationary gas-turbine engines, is the development of small turbines for driving the relatively small-output generators of independent power plants. Such plants are coming into wide use in areas where public power service is nonexistent or unreliable.

Gas-turbine engines of this type generally use a gas fuel, either natural gas or liquefied gas. Typical examples include methane, ethane, propane, butane and the like. For improved emission performance, the combustion temperature (adiabatic flame temperature) of such gas-turbine engines is preferably controlled to fall within the prescribed range indicated by the reference symbols a and b in FIG. 13 so as to reduce NOx, CO and other harmful emissions.

Emission performance is also affected by the combustion conditions. In particular, the level of NOx emission rises with increasing combustion temperature. Although premix combustion is advantageous from the aspect of emission performance, because combustion proceeds with uniform temperature distribution, the combustion is liable to be unstable or experience flame-out. On the other hand, diffusive combustion is stable but includes scattered high-temperature regions that increase NOx emission.

Therefore, when the combustion temperature is in a particular region of the temperature range indicated in FIG. 13, specifically when it is above the lower limit value indicated by the reference symbol a, premix combustion is preferable from the aspect of emission performance but is disadvantageous depending on the operating condition because, during idling, for example, the instability of premix combustion may lead to flame-out. A need is therefore felt for a gas-turbine engine of the type under discussion that is capable of operating stably in response to load demand, without flame-out, while achieving excellent emission performance.

Use of natural gas poses a special problem. Since some localities do not set a standard regarding natural gas constituents, the composition of the supplied gas (fuel composition) may vary. Variation in gas composition causes variation in the amount of heat produced by the combustion.

When gas of a constant composition is unavailable, flame-out can be avoided by setting the lower limit value a for switching from diffusive combustion to premix combustion relatively high. But this solution has the drawback that emission performance declines in proportion to the reduction of the premix combustion operating region.

The problem caused by variation in gas composition arises because, even when the gas supply rate is maintained constant, the combustion temperature varies owing to fluctuation in the amount of heat produced by the combustion. Monitoring the gas composition is, however, substantially impossible.

Further, as taught by Japanese Laid-Open Patent Application No. Hei 1 (1989)-163426, a multiplex venturi mixer composed of a plurality of individual venturi mixers has been developed., which mixes the gas fuel with the sucked air with the mixers. When the conventional detection method is applied to this type of multiplex venturi mixers, the throat pressure of the individual venturi mixers must be detected. This complicates the structure owing to the need for a large number of sensors and the like.

Furthermore, when this type of multiple venturi mixer is used as shown, the flow rates of the individual mixers may inevitably be different from each other due to the manufacturing variance, aging and some similar factors. Even if the mixers are manufactured with careful attention to the size, the mixer outlet pressure, etc. will cause the individual flow rates to vary, making it difficult to control the supply of gas fuel or air/fuel ratio accurately.

SUMMARY OF THE INVENTION

A first object of this invention is therefore to overcome this problem by providing a control system for a gas-turbine engine that uses a gas fuel such as natural gas, which, when operated using a gas fuel whose composition is not constant, can avoid flame-out and operate stably in response to load demand while also achieving excellent emission performance.

A second object of this invention is therefore to overcome this problem by providing a control system for a gas-turbine engine that uses a multiple venturi mixer, which can control the fuel supply, without the need to detect the throat pressure of each of the multiple venturi mixer.

A third object of this invention is therefore to overcome this problem by providing a control system for a gas-turbine engine that uses a multiple venturi mixer, which can control the fuel supply, even when suffered from the influence of the mixer outlet pressure and some similar factors.

For realizing the first object, the present invention provides a system for controlling a gas-turbine engine having a combustor which is supplied with air drawn in and compressed by a compressor and gas fuel supplied from a gas fuel supply source and which generates a combustion such that resulting combustion gas rotates a turbine that is connected to the compressor and a load to drive the compressor and the load, comprising: fuel regulating means for regulating a flow rate of the gas fuel to be supplied to the combustor; air flow rate detecting means for detecting a flow rate of the air to be supplied to the combustor; oxygen concentration sensor for detecting oxygen concentration of the resulting combustion gas; and calorific value calculating means for calculating a calorific value generated by the combustion in the combustor based on at least the detected flow rate of the air and the oxygen concentration; wherein the fuel regulating means regulating the flow rate of the gas fuel to be supplied to the combustor based on the calculated calorific value.

For realizing the second object, the present invention provides a system for controlling a gas-turbine engine having a system for controlling a gas-turbine engine having a combustor which is supplied with an air-fuel mixture made up of air drawn in through an air intake and supplied through an air passage while being compressed by a compressor and gas fuel supplied through a fuel supply passage from a gas fuel supply source and which generates a combustion such that resulting combustion gas rotates a turbine that is connected to the compressor and a load to drive the compressor and the load, comprising: fuel regulating means provided at the fuel supply passage for regulating a flow rate of the gas fuel to be supplied to the combustor; a venturi tube having an inlet end connected to the air passage and an outlet end opened into the combustor, the venturi tube having a throat of a predetermined sectional area at a location between the inlet end the outlet end; gas fuel jetting means having an inlet end connected to the fuel supply passage at a location downstream of the fuel regulating means and an outlet end connected to the throat of the venturi pipe, the gas fuel jetting means having an orifice of a predetermined opening area which jets the gas fuel supplied from the fuel supply passage into the air passing the throat to form the air-fuel mixture to be supplied to the combustor; gas fuel mass flow rate calculating means for calculating a mass flow rate of the gas fuel passing through the orifice; gas fuel temperature detecting means for detecting a temperature of the gas fuel; gas fuel pressure detecting means for detecting a pressure of the gas fuel; venturi inlet air temperature detecting means for detecting an inlet temperature of the air flowing into the venturi pipe; venturi inlet air pressure detecting means for detecting an inlet pressure of the air flowing into the venturi pipe; air mass flow rate calculating means for calculating a mass flow rate of the air passing through the throat based on the calculated mass flow rate of the gas fuel, the detected gas fuel temperature and the pressure, the detected inlet air temperature and the pressure, the predetermined sectional area of the throat, and the predetermined opening area of the orifice; and fuel supply control means for controlling supply of the gas fuel through the fuel regulating means based on the calculated flow rates of the gas fuel and the air.

For realizing the third object, the present invention provides a system for controlling a gas-turbine engine having a combustor which is supplied with an air-fuel mixture made up of air drawn in through an air intake and supplied through an air passage while being compressed by a compressor and gas fuel supplied through a fuel supply passage from a gas fuel supply source and which generates a combustion such that resulting combustion gas rotates a turbine that is connected to the compressor and a load to drive the compressor and the load, comprising: fuel regulating means provided at the fuel supply passage for regulating a flow rate of the gas fuel to be supplied to the combustor; a venturi tube having an inlet end connected to the air passage and an outlet end opened into the combustor, the venturi tube having a throat of a predetermined sectional area at a location between the inlet end the outlet end; gas fuel jetting means having an inlet end connected to the fuel supply passage at a location downstream of the fuel regulating means and an outlet end connected to the throat of the venturi pipe, the gas fuel jetting means having an orifice of a predetermined opening area which jets the gas fuel supplied from the fuel supply passage into the air passing the throat to form the air-fuel mixture to be supplied to the combustor; and fuel supply control means for controlling supply of the gas fuel through the fuel regulating means; wherein a ratio of the predetermined sectional area of the throat and the predetermined opening area of the orifice is set to a predetermined value.

BRIEF DESCRIPTION OF THE DRAWINGS

The above and other objects and advantages of the invention will be more apparent from the following description and drawings, in which:

FIG. 7 is a diagram for explaining the principle underlying the calculation of air mass flow rate during the operation illustrated in FIG. 3;

DETAILED DESCRIPTION OF THE PREFERRED EMBODIMENT

A control system for a gas-turbine engine according to an embodiment of this invention will now be explained with reference to the drawings.

Figure 1:
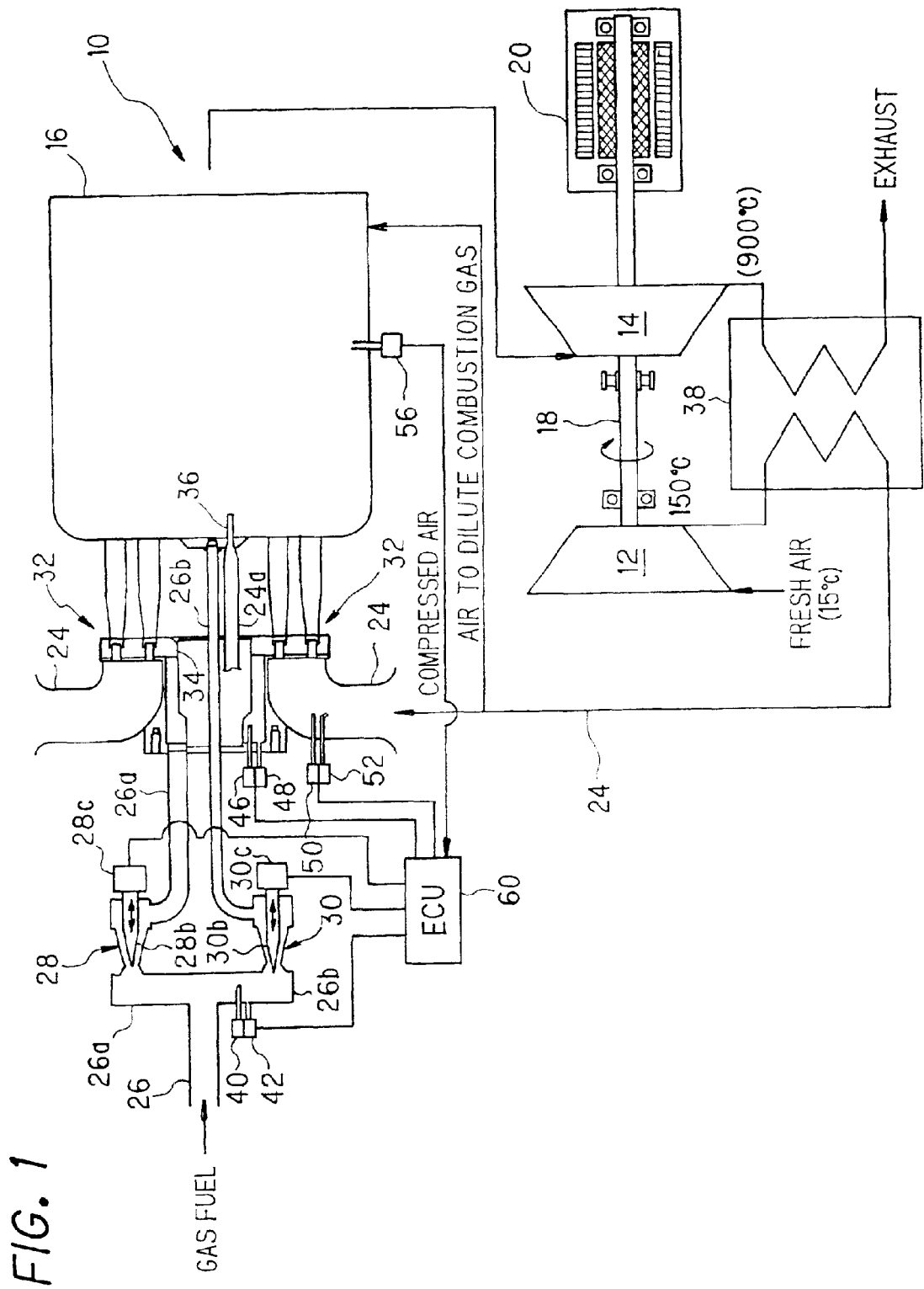
FIG. 1 is an overall schematic view of a control system for a gas-turbine engine according to an embodiment of this invention.

FIG. 1 is a schematic view of the system.

The overall gas-turbine engine is designated by reference numeral 10 in FIG. 1. The gas-turbine engine 10 is equipped with a compressor 12, a turbine 14 and a combustor 16. The compressor 12 is driven by rotation of the turbine 14 transmitted through an output shaft (turbine shaft) 18 of the turbine 14 connecting the two.

The output shaft of the turbine 14 is also connected to a generator (load) 20. The generator 20 is driven by the turbine 14 to generate around 100 kW of electric power. Electrical equipment (not shown) is connected to the generator 20 as an electric load.

An air passage 24 communicating with an air intake port (not shown) and a fuel supply passage 26 communicating with a gas fuel source (not shown) are connected to the combustor 16. The fuel is natural gas or the like.

The fuel supply passage 26 bifurcates into a branch passage 26a and a branch passage 26b. A first fuel control valve (flow regulating means) 28 is provided in the branch passage 26a and a second fuel control valve (flow regulating means) 30 is provided in the branch passage 26b.

Figure 2:
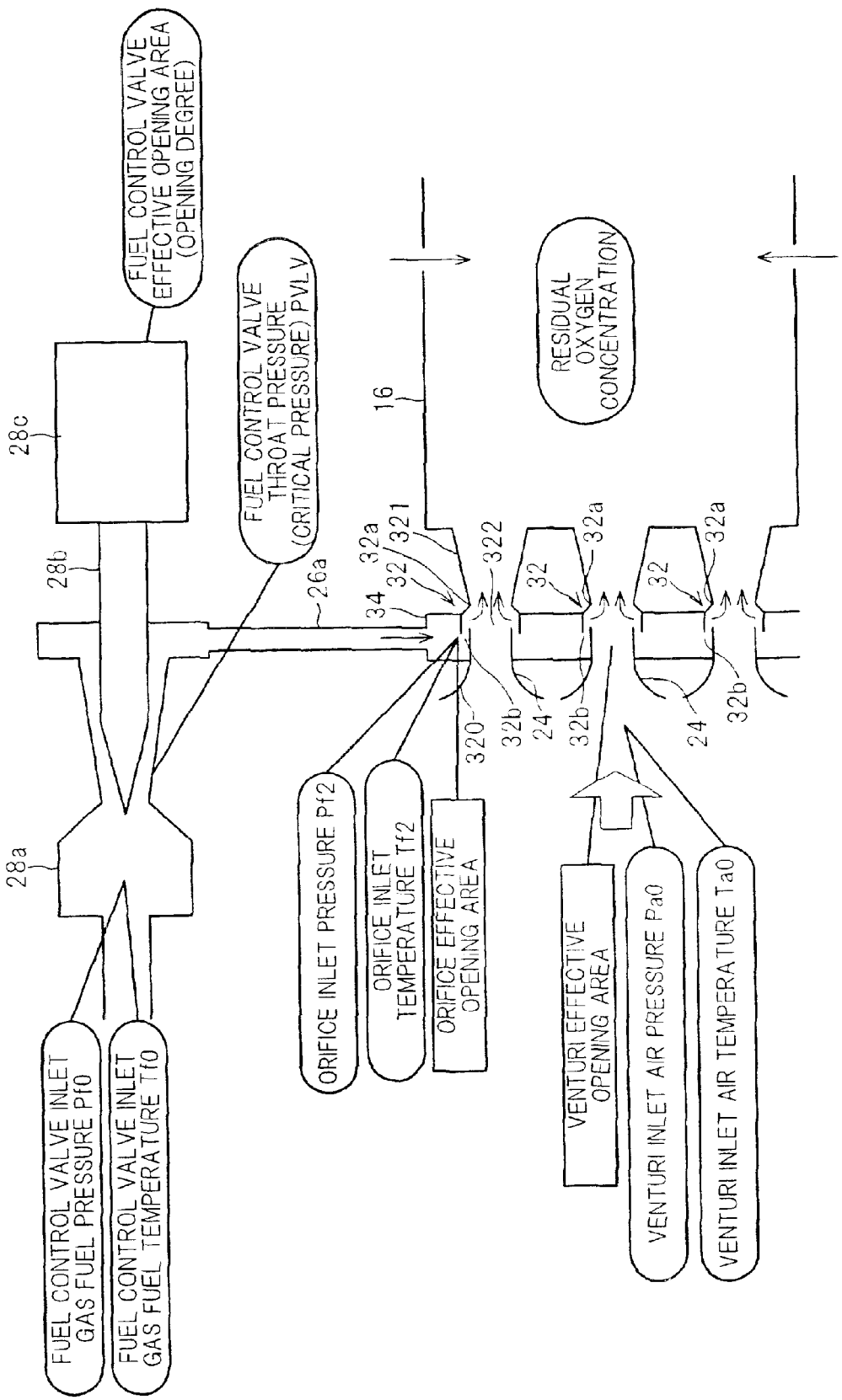
FIG. 2 is a schematic view for explaining the structure of a fuel control valve, venturi mixer and other components of the system illustrated in FIG. 1.

As illustrated schematically in FIG. 2, the first fuel control valve 28 (and the second fuel control valve 30) is composed of a housing 28a (30a) connected to the fuel supply passage 26, a needle valve body 28b (30b) accommodated in the housing 28a (30a), and a linear solenoid, a stepper motor or other actuator 28c (30c) for axially advancing/retracting the needle valve body 28b (30b) in/out of the housing 28a (30a).

(As indicated parenthetically, the structure of the second fuel control valve 30 is similar to that shown in FIG. 2.)

Downstream of the first fuel control valve 28, the branch passage 26a of the fuel supply passage 26 connects with a common chamber 34 of a multiplex venturi mixer 32. The multiplex venturi mixer 32 is composed of multiple (e.g., 24) venturi mixers. Only two of the multiple venturi mixer are shown in the figures for simplicity of illustration.

As schematically illustrated in FIG. 2, each of the multiplex venturi mixers 32 comprises of a venturi tube 32a and an orifice (acting as a throttle) 32b. The inlet end 320 of the venturi tubes 32a communicates with the air passage 24 (not shown in FIG. 2). The other end 321 thereof is constituted as a pipe that opens into the combustor 16 and is formed with narrowed throats 322 of a prescribed area.

The inlet ends of the orifices 32b communicate with the common chamber 34. The outlet ends thereof are constituted as openings of prescribed area formed at the throats 322 of the venturi tube. The gas fuel is jetted into air passing through the throats 322 to produce an air-fuel mixture.

As shown in FIG. 1, the portion of the branch passage 26b of the fuel supply passage 26 extending downstream from the second fuel control valve 30 passes through the wall of the combustor 16 into the interior thereof. It jets gas fuel into the combustor 16. Reference symbol 36 designates an ignition plug.

In the gas-turbine engine 10 according to this embodiment, the gas fuel supplied through the branch passage 26a is premixed with air in the multiplex venturi mixer 32 and the air-fuel mixture is supplied into the combustor 16 to produce premix combustion. The gas fuel supplied through the branch passage 26b is supplied into the combustor 16 separately from air to produce diffusive combustion.

Figure 13:
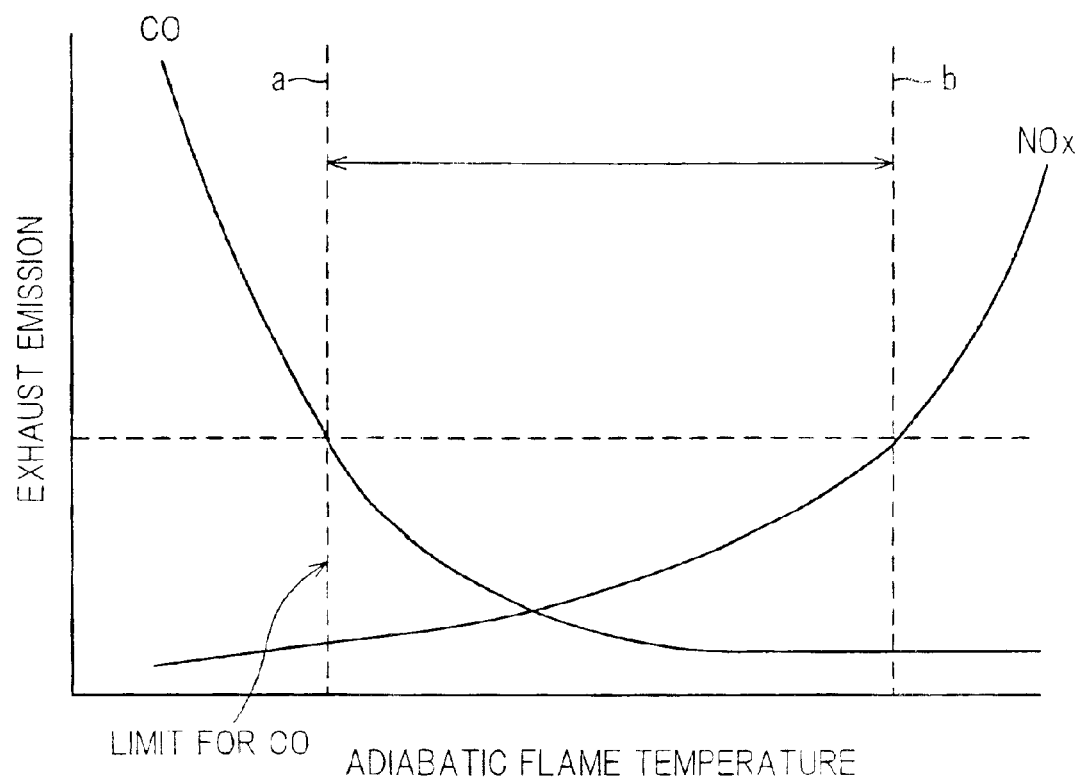
FIG. 13 is graph for explaining control based on the adiabatic flame temperature of the system shown in FIG. 1.

As shown in FIG. 13, NOx, CO and other harmful emissions can be effectively reduced by conducting combustion such that the adiabatic flame temperature (temperature when the air-fuel mixture is burned under adiabatic conditions and indicative of the turbine inlet temperature) falls in the range indicated by the reference symbols a and b. In the temperature region below symbol a, premix combustion is not permissible owing to increase in CO emission and likelihood of combustion instability and flame-out.

The control system for a gas-turbine engine according to this embodiment is therefore for designed to determine the adiabatic flame temperature and conduct premix combustion when the determined adiabatic flame temperature is found to be in the temperature region above the symbol a. Premix combustion is also conducted when the determined adiabatic flame temperature is found to be in the region above the symbol b, despite the fact that NOx emission increases in this region, because, as was explained above, premix combustion lowers NOx emission more effectively than diffusive combustion.

As explained in the foregoing, premix combustion is excellent in emission performance but flame-out is liable to occur when the adiabatic flame temperature decreases during premix combustion. On the other hand, unlike premix combustion, diffusive combustion is stable even at low adiabatic flame temperatures. In addition, under some operating conditions, such as during starting and idling, the gas-turbine engine 10 is incapable of premix combustion.

In the system according to this embodiment, therefore, premix combustion is conducted when the adiabatic flame temperature is in the temperature region above the symbol a and diffusive combustion is conducted when it is in the temperature region below the symbol a.

The combustion state is switched depending on the operating condition of the gas-turbine engine 10. When the gas-turbine engine 10 is in an operating condition such as starting or idling that makes premix combustion impossible, it is switched to diffusive combustion. In other operating conditions, it is switched to premix combustion.

With this configuration, the gas-turbine engine 10 can achieve stable combustion over the whole range of operating conditions while also effectively reducing CO, NOx and other harmful emissions. The system according to this embodiment thus makes it possible to realize stable combustion and good emission performance simultaneously.

Moreover, as explained earlier, although a situation in which supply of gas of a constant composition is not obtainable can be coped with by setting the lower limit value a for switching from diffusive combustion to premix combustion relatively high, this results in lost emission performance.

In the control system for a gas-turbine engine according to this embodiment, therefore, emission performance is enhanced by accurately detecting the adiabatic flame temperature based on the oxygen concentration (residual oxygen concentration after combustion) etc. and controlling combustion mode switching accordingly. (This will be explained further below with reference to FIGS. 3 and 4.)

The system also calculates the calorific value based on the oxygen concentration and the like and controls the supply of fuel based on the calculated value. This control is carried out because when the fuel composition varies, causing the lower calorific value to vary, the control of fuel supply to the gas-turbine engine 10 either falls in accuracy or, in extreme cases, becomes impossible.

To avoid this control accuracy degradation, the control system for a gas-turbine engine according to this embodiment is therefore configured to calculate the calorific value based on the oxygen concentration and the like and use the calculated value to maintain the desired value by feedback control.

In the gas-turbine engine 10 shown in FIG. 1, air drawn in through the air intake port and forwarded through the air passage 24 under compression by the compressor 12 is either mixed with the gas fuel supplied from the gas fuel source through the branch passage 26a of the fuel supply passage and supplied to the combustor 16 for combustion or, without mixing, is supplied to the combustor 16 separately of fuel supplied thereto through the branch passage 26a of the fuel supply passage for combustion. The resulting combustion gas rotates the turbine 14 to drive the compressor 12 and the generator 20 through the turbine shaft 18.

As shown at the bottom of FIG. 1, the combustion gas used to rotate the turbine 14, which is still at a high temperature of around 900° C., is sent to a heat exchanger 38, where it is used to elevate the temperature of the fresh air sucked in by the compressor 12 (atmospheric air at a temperature of, for example, 15° C.) to around 600° C. before being supplied to the venturi mixer 32.

The illustrated gas-turbine engine 10 is thus of the regenerative type. Part of the high-temperature air is mixed with the combustion gas to dilute it.

A first temperature sensor 40 and a first pressure sensor 42 are installed in the fuel supply passage 26 downstream of the branching point and produce outputs proportional to the gas fuel temperature (fuel-control-valve inlet temperature) Tf0 and pressure (fuel-control-valve inlet pressure) Pf0 upstream of (at the inlets of) the first and second fuel control valves 28 and 30.

A second temperature sensor 46 and a second pressure sensor 48 are installed in the branch passage 26a upstream of the venturi mixer 32, more precisely upstream of the orifices 32b, and produce outputs proportional to the gas fuel temperature (orifice inlet temperature) Tf2 and pressure (orifice inlet pressure) Pf2 upstream of (at the inlets of) the orifices 32b.

A third temperature sensor 50 and a third pressure sensor 52 are installed in the air passage 24 upstream of the venturi mixer 32, more precisely upstream of the Venturi tube 32a, and produce outputs proportional to the air temperature (venturi inlet air temperature) Ta0 and pressure (venturi inlet air pressure) Pa0 upstream of (at the inlets of) the Venturi tubes 32a.

An oxygen concentration sensor 56 is installed upstream of the point where diluted air is introduced into the combustor 16 and produces an output proportional to the residual oxygen concentration of the gas after combustion (before dilution). The oxygen concentration sensor 56 is structured not as an $O_2$ sensor but as what is generally referred to as a wide range or universal oxygen concentration sensor and outputs a detection signal proportional to the residual oxygen concentration.

The outputs of all sensors are sent to an ECU (electronic control unit) 60. The ECU 60, a microcomputer, is equipped with a CPU, ROM, RAM and the like (none of which are shown).

The operation of the control system for a gas-turbine engine according to this embodiment will now be explained. The operation is managed by the ECU 60.

Figure 3:
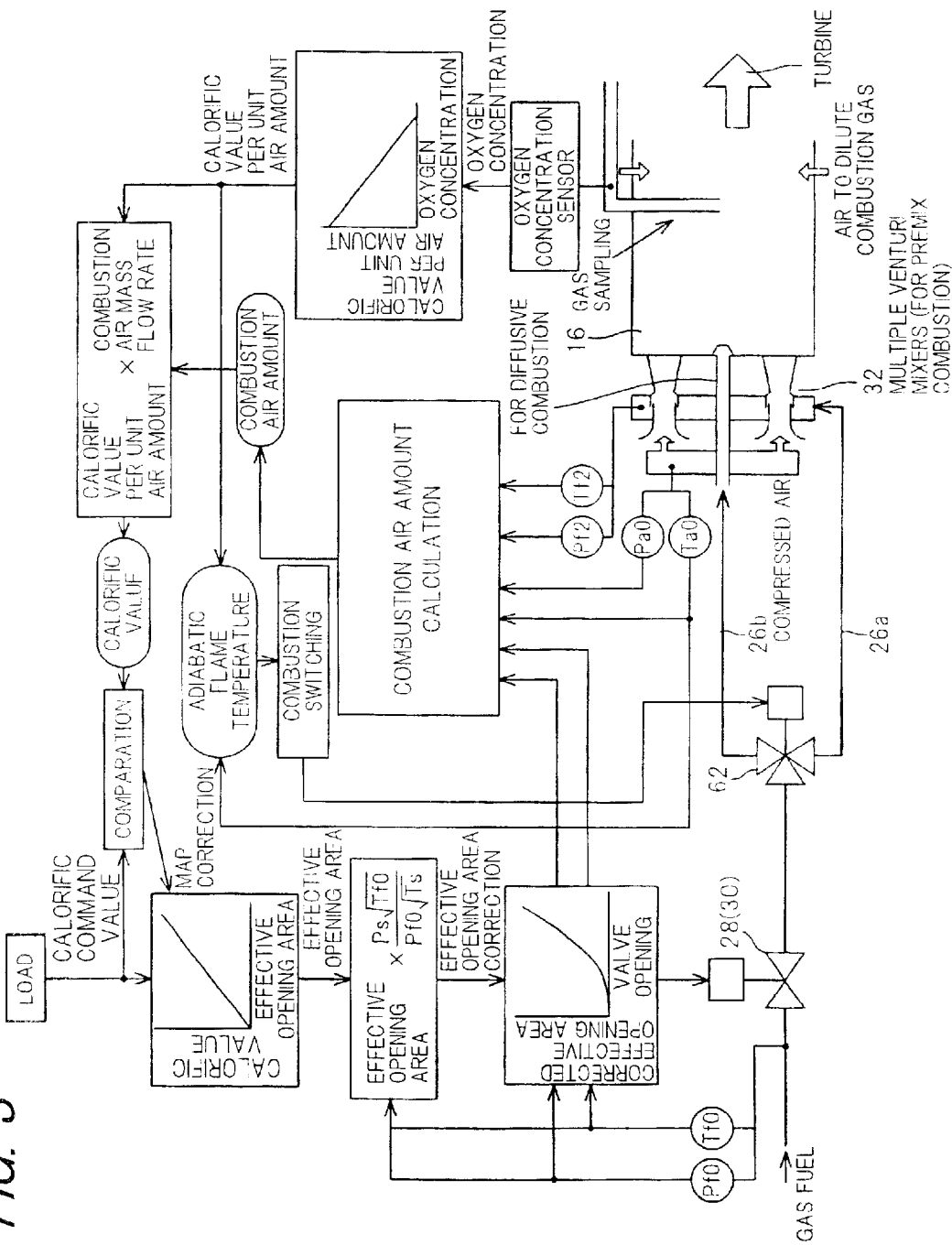
FIG. 3 is a block diagram illustrating the operation of the system illustrated in FIG. 1.

FIG. 3 is a block diagram illustrating the operation.

The ECU 60 calculates a calorific command value (desired calorific value) appropriate for the load placed on the generator 20 by a hooked-up electrical equipment. It then uses the calculated calorific command value to determine an effective opening area for each of the first and second fuel control valves 28, 30. Specifically, it uses the calculated calorific command value as address data to retrieve an effective opening area for each of the first and second fuel control valves 28, 30 from mapped data set relative to the calorific command values in accordance with experimental results using the inlet temperature Tf0 and pressure Pf0 as reference values.

The ECU 60 next corrects the effective opening area of the first and second fuel control valves 28, 30 by the detected upstream temperature Tf0 and pressure Pf0 and uses the corrected effective opening area to retrieve a valve opening experimentally determined to correspond to the corrected effective opening area, i.e., to retrieve a valve opening for each of the first and second fuel control valves 28, 30 (position of the needle valve bodies 28b, 30b). It then drives the actuators 28c (30c) by an amount corresponding to the retrieved valve opening.

The gas fuel flowing through the fuel supply passage 26 flows from the branch passage 26a through the first fuel control valve 28 (and from the branch passage 26b through the second fuel control valve 30). As explained earlier, the ECU 60 conducts combustion mode switching control in response to the adiabatic flame temperature. When necessary, therefore, the ECU 60 switches between combustion modes by outputting a combustion mode switch command to a combustion mode switch 62. By this, the combustor 16 is supplied with gas fuel through one or the other of the branch passage 26a and branch passage 26b.

Although the combustion mode switching means in this embodiment is depicted as a physical component (the combustion mode switch 62), this is only for ease of understanding. As was explained in conjunction with FIG. 1, in the actual configuration, combustion mode switching is effected by the ECU 60 as a programmed operation that selects one or the other of the first fuel control valve 28 and the second fuel control valve 30. Thus, no combustion mode switch 62 is actually employed.

The adiabatic flame temperature is calculated based on the air temperature (inlet air temperature) Ta0 upstream of the Venturi tubes 32a and the calorific value per unit air amount.

The specific method of calculating the adiabatic flame temperature will be explained. First the oxygen concentration of the combustion gas is converted to oxygen concentration relative to the inlet air. This is done to compensate for the mass increase (by the amount of injected fuel) caused by combustion. (For the purpose of the conversion, the fuel composition is assigned an assumed value, such as 100% methane ($CH_4$)).

The oxygen consumption per unit volume air is then calculated from the converted oxygen concentration assuming an atmospheric air oxygen concentration of, say, 21%. This is calculated: as follows:

Oxygen consumption per unit volume air=Atmospheric air oxygen concentration−Oxygen concentration converted to inlet air equivalent.

The calorific value per unit volume air flow rate is then calculated from the calculated oxygen consumption per unit volume air. This is calculated as follows:

Calorific value per unit volume air=Oxygen consumption per unit volume air×Calorific value per unit volume oxygen consumption.

In the above, the calorific value per unit volume oxygen consumption is, for example, 18 [$kJ/m^3N$].

The calculated calorific value per unit volume air flow rate is then converted to calorific value per unit mass air flow rate. This is calculated as follows:

Calorific value per unit mass air flow rate=Calorific value per unit volume air flow rate/1.2928 (normal state air density at 0° C., 1 atm).

Finally, the adiabatic flame temperature is calculated as follows:

Adiabatic flame temperature=Inlet air temperature+(Calorific value per unit mass air flow rate/Combustion gas specific heat)×Correction value.

Since the adiabatic flame temperature is the temperature of the combustion gas, correction like that explained earlier is effected to compensate for the increase in the adiabatic flame temperature owing to increase in fuel mass flow rate (by the amount of injected fuel). (For the purpose of the calculation, the fuel composition is assigned an assumed value, such as 100% methane ($CH_4$)).

The ECU 60 samples the combustion gas in the combustor 16 with the oxygen concentration sensor 56 and, as explained further later, uses the sampled oxygen concentration (residual oxygen concentration) to calculate the calorific value per unit air amount (lower calorific value) in accordance with a predetermined characteristic.

Figure 4:
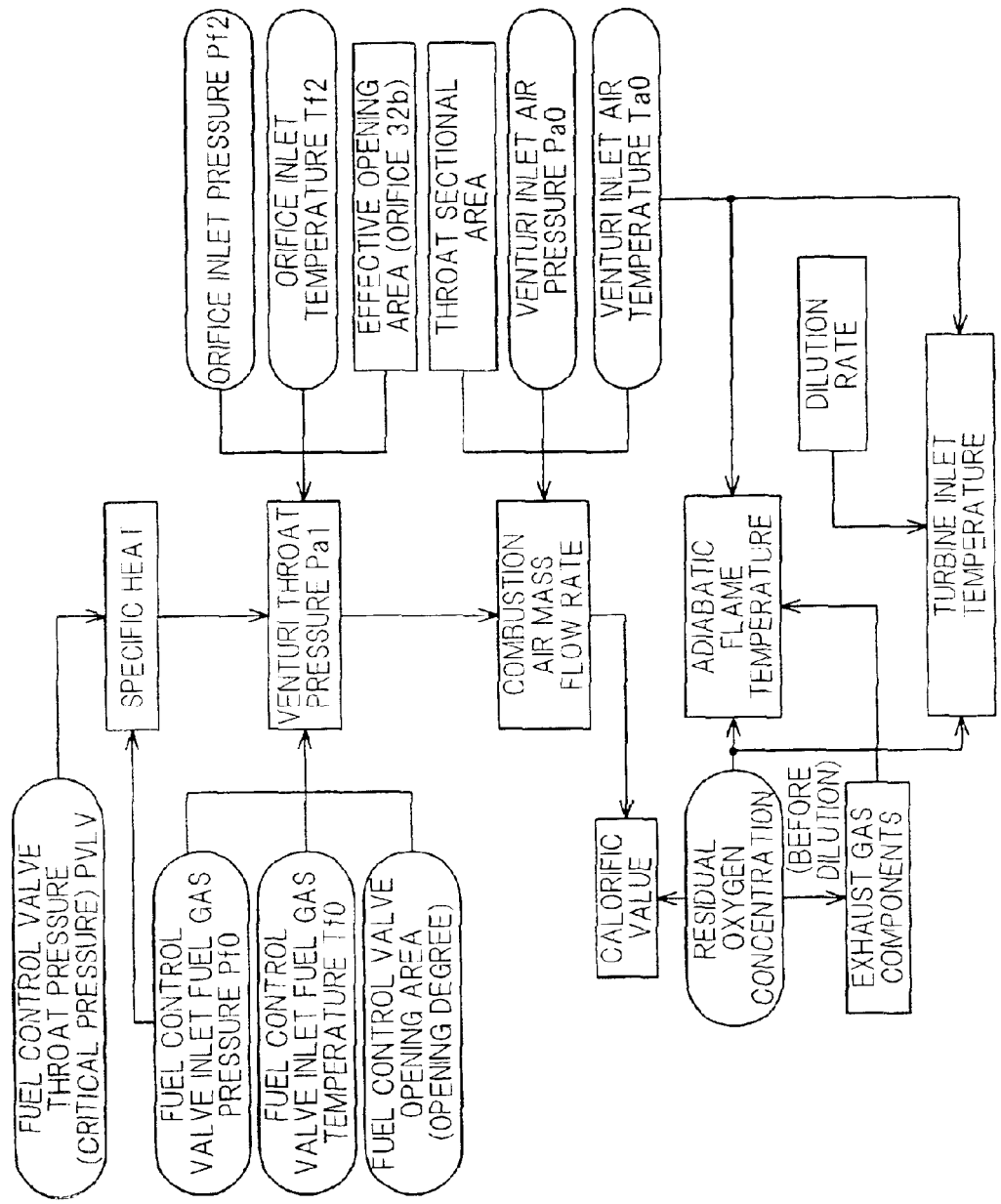
FIG. 4 is a block diagram illustrating a method of calculating combustion air flow rate and other parameters during the operation illustrated in FIG. 3.

On the other hand, the ECU 60 calculates the combustion air amount (air mass flow rate) based on the detected pressure, temperature and the like, as shown in FIG. 4, and multiplies the result by the calculated calorific value per unit air amount to calculate the calorific value (detected calorific value). It compares the detected calorific value with the calorific command value (desired calorific value) and corrects the detected effective opening area to reduce the deviation. As explained earlier, this is for preventing degradation of control accuracy.

Calculation of calorific value based on residual oxygen concentration will now be explained.

Figure 5:
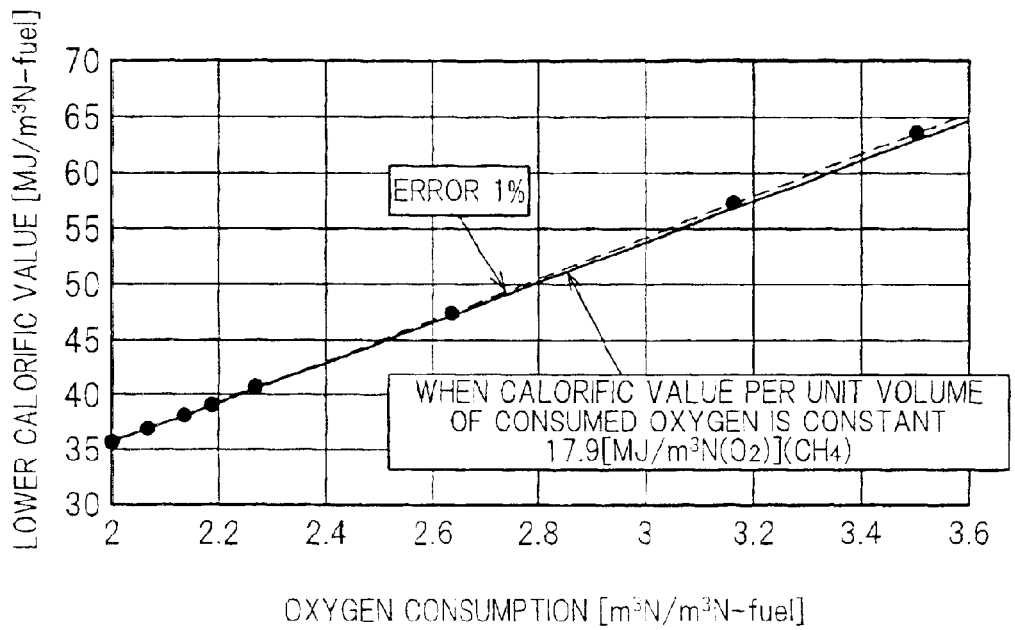
FIG. 5 is a graph compiled from experimental data showing calorific value calculated based on oxygen concentration during the operation illustrated in FIG. 3.

FIG. 5 is a graph compiled from experimental data obtained by the inventor.

In FIG. 5, the horizontal axis is scaled for oxygen consumption [$m^3N/m^3N$-fuel] (amount of oxygen used to consume 1 normal cubic meter of fuel) and the vertical axis is scaled for lower calorific value [$MJ/m^3N$-fuel] (lower calorific value produced by 1 normal cubic meter of fuel). The term "lower calorific value" is used here to mean actual calorific value excluding heat spent to evaporate water.

The plots in FIG. 5 indicate measured values. The straight line represents the theoretical relationship or characteristic for the case of methane ($CH_4$) when the calorific value per unit volume [$MJ/m^3N$] of consumed oxygen ($O_2$) is constant. The measured values deviate from theoretical by 1%. This demonstrates that calorific value can be estimated from oxygen consumption. In other words, it can be seen that calorific value per unit of consumed oxygen stays substantially constant despite fluctuation in the gas fuel composition.

Figure 6:
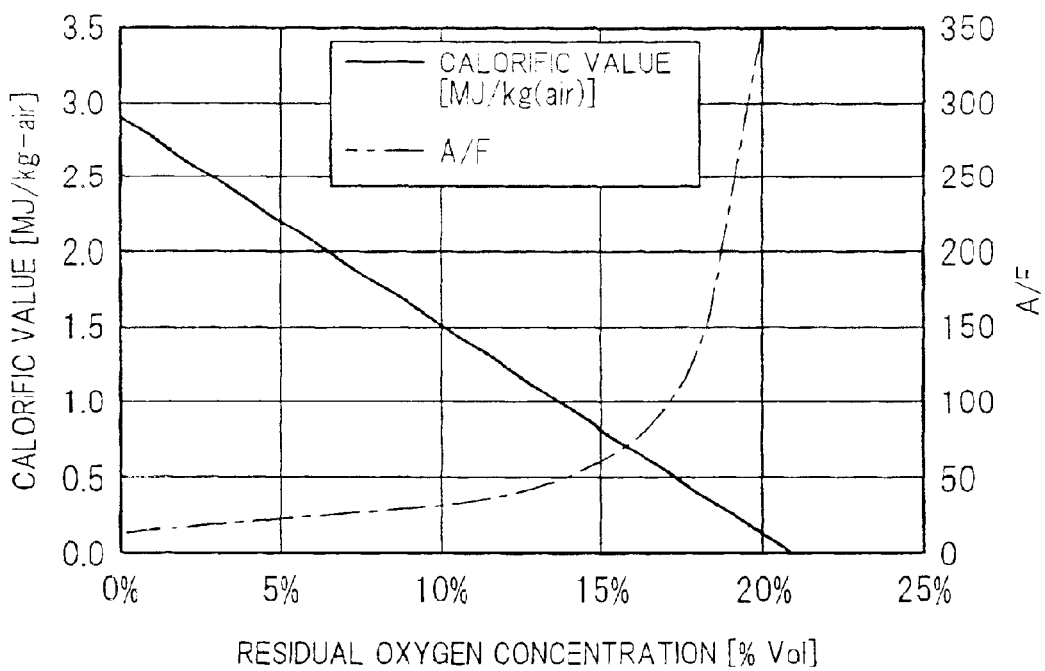
FIG. 6 is a graph for explaining the characteristic of mapped data compiled based on the calorific value computation method illustrated in FIG. 5.

As shown in FIG. 6, therefore, calorific value [MJ/kg-air] (calorific value when 1 kg air is imparted) can be determined or estimated by calculating and preparing residual oxygen concentration (e.g., vol %), the reciprocal of oxygen consumption, relative to calorific value as mapped data, and retrieving the calorific value from the mapped data using measured residual oxygen concentration as address data. This invention is based on this knowledge.

Detection (or calculation) of fuel mass flow rate and air mass flow rate will now be explained.

Conventional detection of flow rate using a venturi requires knowledge of venturi inlet pressure, venturi throat (minimum sectional area portion) pressure, and venturi throat sectional area.

As taught by Japanese Laid-Open Patent Application No. Hei 1 (1989)-163426, a multiplex venturi mixer composed of a plurality of individual venturi mixers has been developed. The venturi mixer 32 in the system according to this embodiment is of this type. When the conventional detection method is applied to the multiplex venturi mixer, the throat pressure of the individual venturi mixers must be detected. This complicates the structure owing to the need for a large number of sensors and the like.

Therefore, as shown in FIG. 4, in the system according to this embodiment the throat pressure Pa1 is calculated based on the fuel pressure, fuel temperature (or concentration) and the like and the result is used to determine the combustion air flow rate (air mass flow rate). By this, the air mass flow rate can be calculated without detecting the throat pressure at every venturi mixer of the multiplex venturi mixer.

This will now be explained.

FIG. 7 is a schematic diagram of the venturi mixer 32 for explaining the principle underlying the calculation.

When the fuel control valve 28 and the venturi mixer 32 are represented in the manner of FIG. 7, the fuel mass flow rate mf and air mass flow rate ma can be represented as shown in the same figure.

By the equations in the figure, the throat pressure Pa1 is uniquely determined when the temperature Tf2 and pressure Pf2 upstream of the orifice 32b and the fuel mass flow rate mf are given.

When the fuel mass flow rate mf is 0, pressure Pf2 upstream of the orifice 32b equals the throat pressure Pa1.

Figure 8:
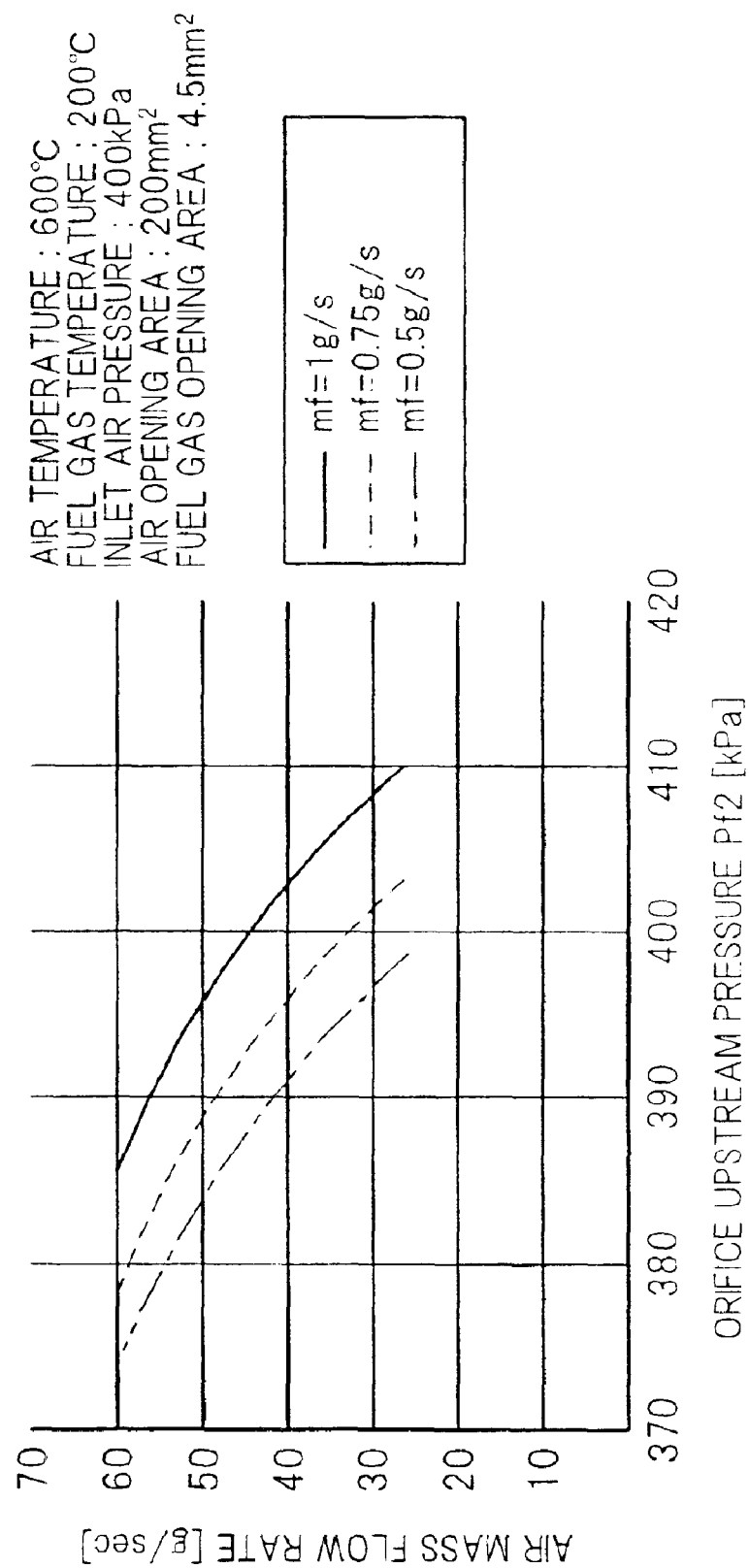
FIG. 8 is a graph compiled from experimental data showing calculated air mass flow rate as a function of throat pressure (fuel pressure) and fuel mass flow rate.

FIG. 8 is a graph compiled from experimental data showing how fuel mass flow rate mf varies with pressure Pf2 upstream of the orifice 32b and air mass flow rate ma. Thus, in determining flow rate, the system according to this embodiment replaces fuel entering the throats 322 with pressure.

Figure 9:
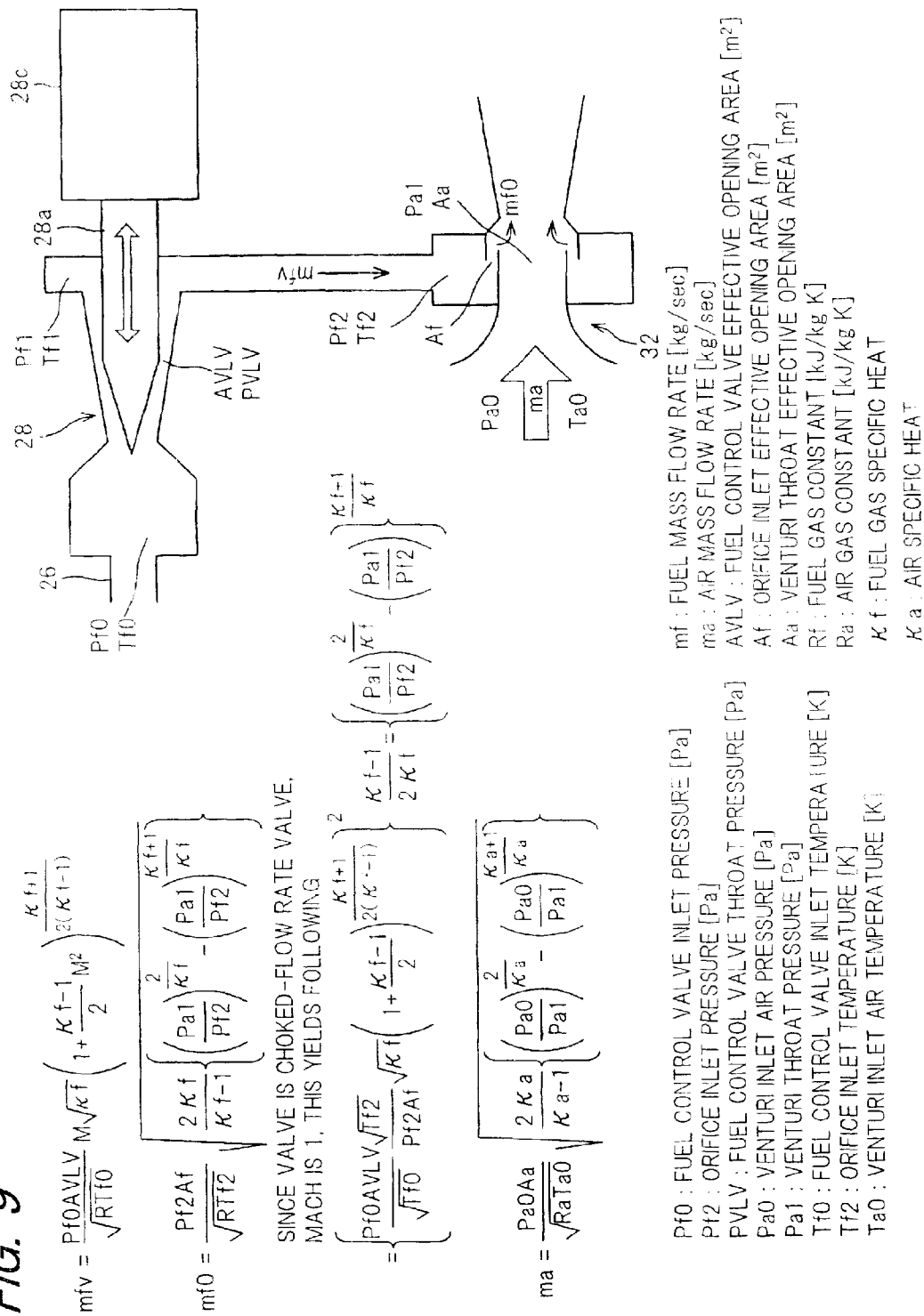
FIG. 9 is an explanatory diagram wherein the configuration of FIG. 7 is replaced with the fuel control valve and venturi mixer illustrated in FIG. 1.

FIG. 9 is a schematic diagram wherein the configuration of FIG. 7 is replaced with the first fuel control valve 28 and venturi mixer 32 of the system according to this embodiment.

In this embodiment, the first fuel control valve 28 is a choked-flow needle valve. A choked-flow needle valve does not require detection of pressure difference when using a sonic flow at a certain critical pressure. The system according to this embodiment applies this property to enable measurement of flow rate from inlet pressure.

In the choked-flow needle valve (first fuel control valve 28), the mass flow rate mfv of the fuel passing through the valve (first fuel control valve 28) and the mass flow rate mfo passing through the orifice (throttling) 32b are equal and can therefore be represented as shown in the figure.

The Mach number M of this valve is 1. The function represented as Pa1/Pf2 therefore assumes the value as shown in FIG. 9. The throat pressure Pa1 can be derived based on the value of this function.

The throat pressure Pa1 can therefore be derived using the effective opening area AVLV of the first fuel control valve 28 and air mass flow rate ma can be readily calculated by substituting the derived value into the shown equation. The effective opening area AVLV of the first fuel control valve 28 is calculated by conversion from the position of the actuator 28c using an appropriate characteristic.

Figure 10:
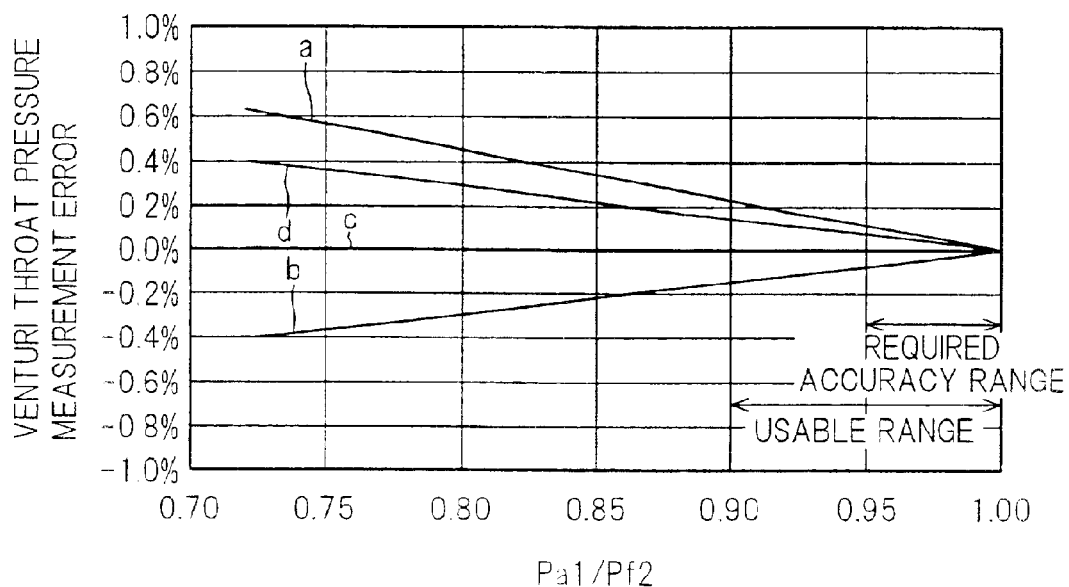
FIG. 10 is a graph compiled from experimental data showing the throat pressure measurement error when using the fuel control valve illustrated in FIG. 1.

FIG. 10 is a graph compiled from experimental data showing the venturi throat pressure Pa1 measurement error when using the choked-flow needle valve (first fuel control valve 28). As shown, the error is around ±1%. In cases where the fuel constituents (physical properties) fluctuate, therefore, the Pa1 measurement error remains considerably small and within a tolerable range even if the specific heat is assumed to be constant.

The other characteristic feature of the system according to this embodiment is to set or design the ratio of effective opening area (sectional area) Aa of the throat 322 of the venturi tube 32a and the effective opening area Af of the orifice 32b of the multiple Venturi mixer 32 to a predetermined value, more precisely to a desired air/fuel ratio. The air/fuel ratio is determined to be 45:1 in the system according to this embodiment.

Specifically, when the multiple Venturi mixer 32 is used as shown, the flow rates of the individual mixers may inevitably be different from each other due to the manufacturing variance, aging and some similar factors. Even if the mixers are manufactured with careful attention to the size, the mixer outlet pressure will cause the individual flow rates to vary, making it difficult to control the air/fuel ratio accurately.

In view of the above, the system is configured to set the ratio of the effective opening area Aa of the throat 322 of each Venturi tube 32a and that Af of each orifice 32b of the multiple Venturi mixer 32 to the predetermined value, thereby enabling to control the air/fuel ratio with highly accuracy, without being affected by a rich or lean air/fuel at a local mixer.

To be more specific, in the configuration shown in FIG. 7, if Pf0 and Pa0 are made equal to each other, the outlet pressure of the orifice 32b becomes Pa1. Accordingly, assuming that what flows through Af and Aa is identical and has the same condition, since the flow velocity at Af and Aa will be same, Aa/Af=ma/mf. From the Bernoulli theorem, Pa1=Pa0−(½) ρa1Va² (here, Va: velocity of air mass flow). since Pa1 is determined by the velocity of air mass flow Va, even when the air mass flow rate varies, ma/mf is constant.

Since the gas fuel and the air are similar in terms of density (property) in the environment where the system is actually used, when Pf2 and Pa0 are made equal to each other, the ratio of the effective opening areas Aa/Af will be almost equal to the ratio of the mass flow rates ma/mf. This indicates that, if Pf2 and Pa0 are constant, the ratio of mass flow rates ma/mf remains constant, even when the air mass flow rate varies due to the influence of an event occurred downstream of the mixer.

Based on this knowledge, the system is configured to set the ratio of the effective opening areas Aa/Af of each of the multiple Venturi mixer 32 to the desired air/fuel ratio of 45:1 or thereabout, thereby preventing the air/fuel ratio at each mixer from being fluctuated.

Figure 11:
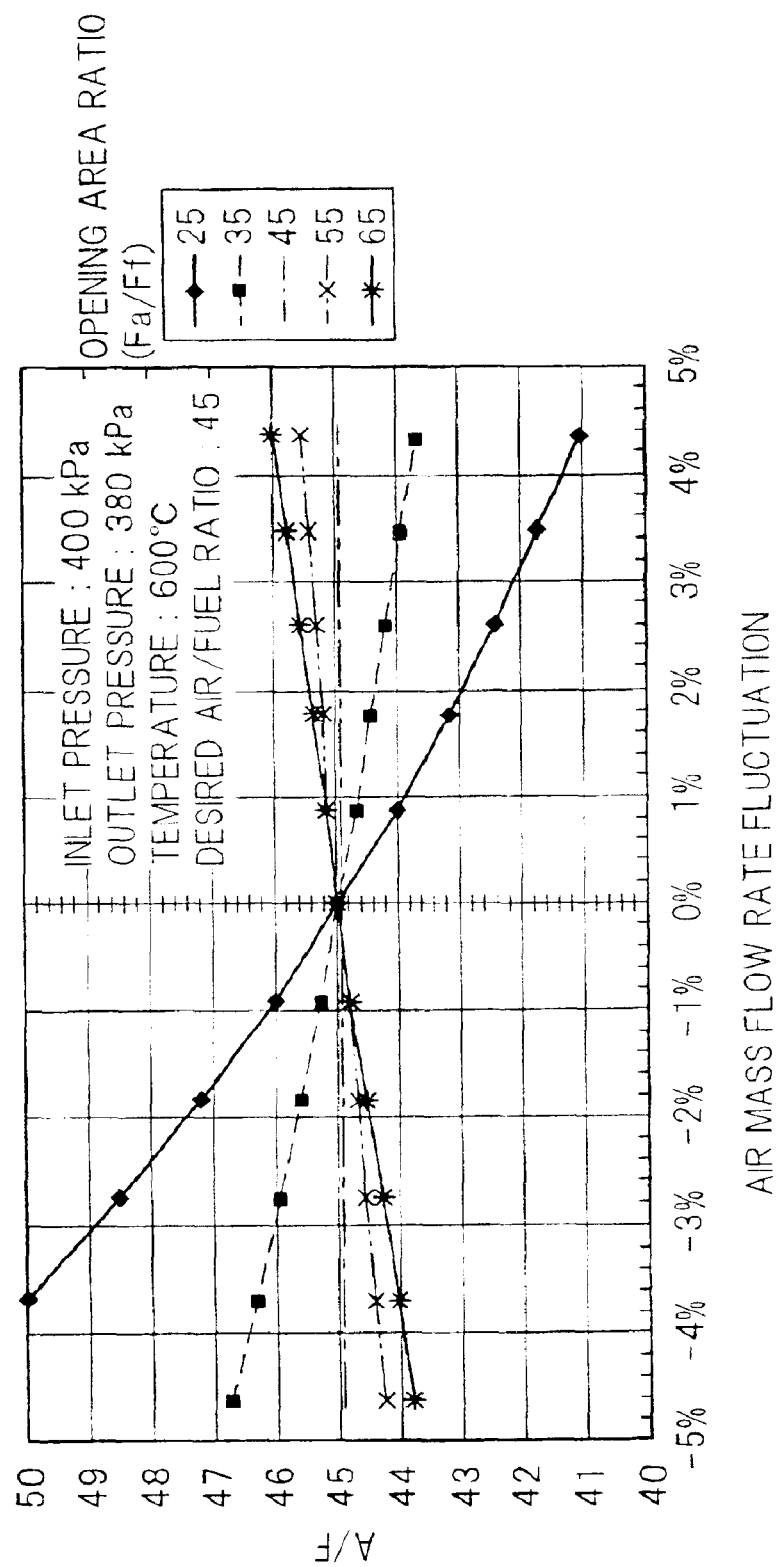
FIG. 11 is a graph compiled from experimental data showing the influence caused by the outlet pressure and a ratio of the effective opening areas.

FIG. 11 is a graph compiled from experimental data showing, when the desired air/fuel ratio is set to 45:1, while the ratio of the effective opening areas is set to specific values of 25:1, 35:1, 45:1, 55:1 and 65:1, the influence on the accuracy of air/fuel ratio control caused by the outlet pressure and these specific values of the effective opening areas. From the figure, it can be seen that the air/fuel ratio is less likely to be affected by the outlet pressure as the ratio of the value of the effective opening area ratio approaches the desired air/fuel ratio.

As mentioned above, when the gas fuel and the air are similar in terms of density (property), it becomes possible to minimize the air/fuel ratio fluctuation among the mixers by making the ratios of Aa/Af and ma/mf equal. However, if they are different in density, it is preferable to correct the ratio Aa/Af by the difference in the density, for example, calculating a ratio therebetween and by using the calculated density ratio to correct the ratio of the effective opening areas.

Accordingly, in the system, defining the density of the air as ρ a0 and that of the gas fuel as ρ f0 a ratio ρ a0/ρ f0 is calculated as an effective opening area ratio correction coefficient and the parameter is used to correct the ratio of the effective opening areas as follows:

*Aa/Af*=effective opening area ratio correction coefficient×desired *ma/mf*.

Figure 12:
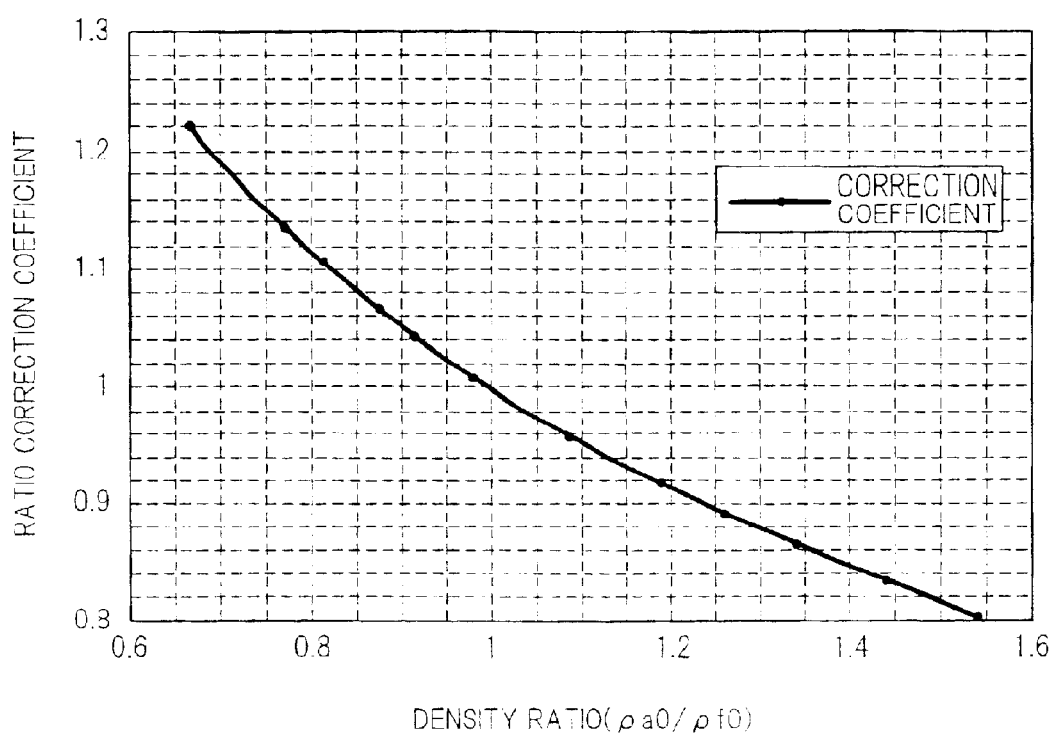
FIG. 12 is a graph showing the characteristic of an effective opening area ratio correction coefficient set relative to a density ratio when methane ($CH_4$) is used as the gas fuel.

FIG. 12 shows the characteristic of the effective opening area ratio correction coefficient set relative to the density ratio ρ a0/ρ f0 when methane ($CH_4$) is used as the gas fuel. Thus, the effective opening area correction coefficient is different for different gas composition.

It should be noted that, when the ratio of the effective opening areas changes, the pressure of supplied gas fuel changes and hence, the density ratio changes. Therefore, when the ratio of the effective opening areas is determined through calculation, it becomes necessary to continue the calculation until a calculated ratio of the effective opening areas obtained by the density ratio determined by a set ratio of the effective opening areas and the effective opening area ratio correction coefficient converges to the set ratio of the effective opening areas.

As explained in the foregoing, the control system for a gas-turbine engine according to this embodiment is configured to conduct premix combustion when the adiabatic flame temperature is in the temperature region above the symbol a and to conduct diffusive combustion when the adiabatic flame temperature is at or in the temperature region below the symbol a.

It is further configured to switch between combustion modes depending on the operating condition of the gas-turbine engine 10. Specifically, it is configured to conduct diffusive combustion under operating conditions that make premix combustion impossible, such as during starting and idling of the gas-turbine engine 10, and to conduct premix combustion under all other operation conditions.

With this configuration, the gas-turbine engine 10 can achieve stable combustion over the entire range of operating conditions while also effectively reducing CO, NOx and other harmful emissions. Stable combustion and good emission performance can therefore be achieved simultaneously.

Moreover, as explained earlier, although a situation in which supply of gas of a constant composition is not obtainable can be coped with by setting the lower limit value a for switching from diffusive combustion to premix combustion relatively high, this results in lost emission performance. In the control system for a gas-turbine engine of the foregoing embodiment, therefore, emission performance is enhanced by accurately detecting the adiabatic flame temperature from the oxygen concentration (residual oxygen concentration after combustion) etc. and controlling combustion mode switching accordingly.

The control system for a gas-turbine engine according to the described embodiment also calculates the calorific value based on the oxygen concentration and the like and controls the supply of fuel based on the calculated value. This control is carried out because when the fuel composition varies, causing the lower calorific value to vary, the control of fuel supply to the gas-turbine engine 10 either falls in accuracy or, in extreme cases, becomes impossible. To avoid this control degradation, the control system is configured to calculate the calorific value based on the oxygen concentration or the like and to use the calculated value to be converged to the desired value in the feedback control.

Furthermore, having been configured in the foregoing manner, the system according to this embodiment can control the supply of gas fuel as desired, without the need to detect the venturi throat pressure Pa1 of each mixer.

Furthermore, since the ratio of effective opening areas (sectional area) Aa of the throat 322 of the venturi tube 32a and the effective opening area Af of the orifice 32b of the multiple Venturi mixer 32 is set to a predetermined value, more precisely to a desired air/fuel ratio (e.g. 45:1), the system according to this embodiment can control the supply of gas fuel accurately, enabling to control the air/fuel ratio with highly accuracy, without being affected by a rich or lean air/fuel at a local mixer, even if the flow rate fluctuates due to the influence of the mixer outlet pressure and some similar factors.

Thus, the embodiment is configured to have a system for controlling a gas-turbine engine 10 having a combustor 16 which is supplied with air drawn in and compressed by a compressor 12 and gas fuel supplied from a gas fuel supply source and which generates a combustion such that resulting combustion gas rotates a turbine 14 that is connected to the compressor and a load (generator 20 and electric load connected thereto) to drive the compressor and the load, comprising: fuel regulating means (branch passage 26a, 26b of the fuel supply passage 26; first fuel control valve 28, second fuel control valve 30, multiple venturi mixer 32, ECU 60) for regulating a flow rate of the gas fuel to be supplied to the combustor; air flow rate detecting means (third temperature sensor 50, third pressure sensor 52, etc, ECU 60) for detecting a flow rate of the air (air mass flow rate ma) to be supplied to the combustor; oxygen concentration sensor (56, ECU 60) for detecting oxygen concentration (residual oxygen concentration) of the resulting combustion gas; and calorific value calculating means (ECU 60) for calculating a calorific value generated by the combustion in the combustor based on at least the detected flow rate of the air and the oxygen concentration; wherein the fuel regulating means regulating the flow rate of the gas fuel to be supplied to the combustor based on the calculated calorific value. Thus, the calorific value produced by the combustion in the combustor is calculated based on the detected air flow rate and oxygen concentration, and the amount of gas fuel supplied to the combustor is regulated based on the calculated calorific value. Even in a case where the composition of the natural gas or other gas fuel used is not constant, therefore, stable operation can be achieved in response to load demand, without flame-out, while achieving excellent emission performance.

In the system, the fuel regulating means includes: premix combustion generating means (branch passage 26a of the fuel supply passage 26, first fuel control valve 28, air passage 24, multiple venturi mixer 32, ECU 60) for mixing the air and the gas fuel and for generating an air-fuel mixture to be supplied to the combustor such that a premix combustion is generated; diffusive combustion generating means (branch passage 26b of the fuel supply passage 26, second fuel control valve 30, ECU 60) for supplying the air and the gas fuel separately to the combustor such that a diffusive combustion is generated; adiabatic flame temperature calculating means (ECU 60) for calculating an adiabatic flame temperature generated by the combustion indicative of an inlet temperature of the turbine based on at least the detected oxygen concentration; and combustion selecting means (ECU 60, combustion mode switch 62) for selecting one of the premix combustion generating means and the diffusive combustion generating means based on at least the calculated adiabatic flame temperature. Thus, one or the other of the premix combustion means or the diffusive combustion means is selected in response to the calculated adiabatic flame temperature. It is therefore possible not only to achieve excellent emission performance but also to avoid flame-out and the like by switching from premix combustion, which is inferior in combustion stability, to diffusive combustion, thus simultaneously realizing stable combustion and enhanced emission performance.

In the system, the fuel regulating means includes: premix combustion generating means (branch passage 26a of the fuel supply passage 26, first fuel control valve 28, air passage 24, multiple venturi mixer 32, ECU 60) for mixing the air and the gas fuel and for generating an air-fuel mixture to be supplied to the combustor such that a premix combustion is generated; diffusive combustion generating means (branch passage 26b of the fuel supply passage 26, second fuel control valve 30, ECU 60) for supplying the air and the gas fuel separately to the combustor such that a diffusive combustion is generated; operating condition detecting means (ECU 60) for detecting operating condition of the engine; and combustion selecting means (ECU 60, combustion mode switch 62) for selecting one of the premix combustion generating means and the diffusive combustion generating means based on the detected operating condition of the engine. With this, the engine operating condition is discriminated and one of the premix combustion means and the diffusive combustion means is selected in response to the result of the discrimination. Stable combustion and enhanced emission performance can therefore be simultaneously realized even more readily.

In the system, the calorific value calculating means includes: calorific value per unit air amount calculating means (ECU 60) for calculating a calorific value per unit amount (calorific value per unit air amount) of the air based on the detected oxygen concentration; and determines the calorific value by multiplying the calorific value per unit amount of the air by the detected flow rate of the air. Thus, the calorific value per unit air amount is calculated based on the detected oxygen concentration, and the calculated calorific value and the detected air flow rate are multiplied to calculate the calorific value. Therefore, the gas fuel supplied to the combustor can be accurately regulated such that even in a case where the composition of the natural gas or other gas fuel used is not constant, degradation and impossibility of fuel supply control can be effectively prevented.

In the system, the fuel regulating means includes a feedback control loop having: desired calorific command value determining means (ECU 60) for determining a desired calorific command value to be generated by the combustion based on the load; gas fuel flow rate controlling means (ECU 60) for controlling the flow rate of the gas fuel based on the determined desired calorific command value; error calculating means for calculating an error between the determined desired calorific command value and the calculated calorific value; and desired calorific command value correcting means for correcting the determined desired calorific command value based on the calculated error. Since deviation from the desired calorific value is determined and feedback control of the desired calorific value is effected in accordance with the determined deviation. Therefore, the gas fuel supplied to the combustor can be still more accurately regulated such that even in a case where the composition of the natural gas or other gas fuel used is not constant, degradation and impossibility of fuel supply control fuel supply can be still more effectively prevented.

In the system, the gas fuel flow rate controlling means comprises a fuel control valve and includes; valve opening calculating means for calculating an opening of the fuel control valve in accordance with a predetermined characteristic preset relative to the desired calorific command value; and controls the flow rate of the gas fuel based on the determined opening of the valve. Since the valve opening is derived in accordance with a characteristic established with respect to the desired calorific value beforehand and the gas fuel flow rate is regulated based on the derived valve opening. By this, degradation and impossibility of fuel supply control can be still more effectively prevented and, in addition, fuel supply control can be enhanced even further.

Further, the embodiment is configured to have a system for controlling a gas-turbine engine 10 having a combustor 16 which is supplied with an air-fuel mixture made up of air drawn in through an air intake and supplied through an air passage 24 while being compressed by a compressor 12 and gas fuel supplied through a fuel supply passage 26a from a gas fuel supply source and which generates a combustion such that resulting combustion gas rotates a turbine 14 that is connected to the compressor and a load (generator 20 and its electric load) to drive the compressor and the load, comprising: fuel regulating means (first control valve 28) provided at the fuel supply passage 26a for regulating a flow rate of the gas fuel to be supplied to the combustor; a venturi tube 32a having an inlet end 320 connected to the air passage 24 and an outlet end 321 opened into the combustor 16, the venturi tube having a throat 322 of a predetermined sectional area (effective opening area Aa) at a location between the inlet end and the outlet end; gas fuel jetting means (orifice 32b) having an inlet end connected to the fuel supply passage 26a at a location downstream of the fuel regulating means and an outlet end connected to the throat 322 of the venturi pipe, the gas fuel jetting means having an orifice 32b of a predetermined opening area which jets the gas fuel supplied from the fuel supply passage into the air passing the throat to form the air-fuel mixture to be supplied to the combustor; gas fuel mass flow rate calculating means (ECU 60) for calculating a mass flow rate of the gas fuel mf passing through the orifice; gas fuel temperature detecting means (first temperature sensor 40) for detecting a temperature of the gas fuel Tf0; gas fuel pressure detecting means (first pressure sensor 42) for detecting a pressure of the gas fuel Pf0; venturi inlet air temperature detecting means (third temperature sensor 50) for detecting an inlet temperature of the air Ta0 flowing into the venturi pipe; venturi inlet air pressure detecting means (third pressure sensor 52) for detecting an inlet pressure of the air Pa0 flowing into the venturi pipe; air mass flow rate calculating means (ECU 60) for calculating a mass flow rate of the air ma passing through the throat based on the calculated mass flow rate of the gas fuel mf, the detected gas fuel temperature Tf0 and the pressure Pf0, the detected inlet air temperature Ta0 and the pressure Pa0, the predetermined sectional area of the throat (effective opening area Aa), and the predetermined opening area of the orifice (effective opening area Af); and fuel supply control means (ECU 60) for controlling supply of the gas fuel through the fuel regulating means based on the calculated flow rates of the gas fuel and the air.

In the system, a plurality of the gas fuel jetting means and the venturi tubes are provided such that they form a multiple venturi mixer 32.

Furthermore, the embodiment is configured to have a system for controlling a gas-turbine engine 10 having a combustor 16 which is supplied with an air-fuel mixture made up of air drawn in through an air intake and supplied through an air passage 24 while being compressed by a compressor 12 and gas fuel supplied through a fuel supply passage 26a from a gas fuel supply source and which generates a combustion such that resulting combustion gas rotates a turbine 14 that is connected to the compressor and a load (generator 20 and its electric load) to drive the compressor and the load, comprising: fuel regulating means (first fuel control valve 28) provided at the fuel supply passage 26a for regulating a flow rate of the gas fuel to be supplied to the combustor; a venturi tube 32a having an inlet end 320 connected to the air passage 24 and an outlet end 321 opened into the combustor 16, the venturi tube having a throat 322 of a predetermined sectional area (effective opening area Aa) at a location between the inlet end and the outlet end; gas fuel jetting means (orifice 32b) having an inlet end connected to the fuel supply passage at a location downstream of the fuel regulating means and an outlet end connected to the throat 322 of the venturi pipe, the gas fuel jetting means having an orifice 32b of a predetermined opening area (effective opening area Af) which jets the gas fuel supplied from the fuel supply passage into the air passing the throat to form the air-fuel mixture to be supplied to the combustor; and fuel supply control means (ECU 60) for controlling supply of the gas fuel through the fuel regulating means; wherein a ratio of the predetermined sectional area of the throat and the predetermined opening area of the orifice is set to a predetermined value.

In the system, the predetermined value is a desired air/fuel ratio (45:1) based on which the fuel supply control means control the supply of the gas fuel.

The system further includes: predetermined value correcting means for correcting the predetermined value based on a ratio of densities of the air ($\rho$ a0) and the gas fuel ($\rho$ f0).

The system further includes: gas fuel mass flow rate calculating means (ECU 60) for calculating a mass flow rate of the gas fuel mf passing through the orifice; gas fuel temperature detecting means (first temperature sensor 40) for detecting a temperature of the gas fuel Tf0; gas fuel pressure detecting means (first pressure sensor 42) for detecting a pressure of the gas fuel Pf0; venturi inlet air temperature detecting means (third temperature sensor 50) for detecting an inlet temperature of the air Ta0 flowing into the venturi pipe; venturi inlet air pressure detecting means (third pressure sensor 52) for detecting an inlet pressure of the air Pa0 flowing into the venturi pipe; and air mass flow rate calculating means (ECU 60) for calculating a mass flow rate of the air ma passing through the throat based on the calculated mass flow rate of the gas fuel mf, the detected gas fuel temperature Tf0 and the pressure Pf0, the detected inlet air temperature Ta0 and the pressure Pa0, the predetermined sectional area of the throat (Aa), and the predetermined opening area of the orifice (Af); wherein the fuel supply control means controls the supply of the gas fuel through the fuel regulating means based on the calculated flow rates of the gas fuel and the air.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a gas-turbine engine having a combustor which is supplied with air drawn in and compressed by a compressor and gas fuel supplied from a gas fuel supply source and which generates a combustion such that resulting combustion gas rotates a turbine that is connected to the compressor and a load to drive the compressor and the load, comprising:

fuel regulating means for regulating a flow rate of the gas fuel to be supplied to the combustor;

air flow rate detecting means for detecting a flow rate of the air to be supplied to the combustor;

oxygen concentration sensor for detecting oxygen concentration of the resulting combustion gas; and calorific value calculating means for calculating a calorific value generated by the combustion in the combustor based on at least the detected flow rate of the air and the oxygen concentration;

wherein the fuel regulating means regulating the flow rate of the gas fuel to be supplied to the combustor based on the calculated calorific value.

2. A system according to claim 1, wherein the fuel regulating means includes:

premix combustion generating means for mixing the air and the gas fuel and for generating an air-fuel mixture to be supplied to the combustor such that a premix combustion is generated;

diffusive combustion generating means for supplying the air and the gas fuel separately to the combustor such that a diffusive combustion is generated;

adiabatic flame temperature calculating means for calculating an adiabatic flame temperature generated by the combustion indicative of an inlet temperature of the turbine based on at least the detected oxygen concentration; and combustion selecting means for selecting one of the premix combustion generating means and the diffusive combustion generating means based on at least the calculated adiabatic flame temperature.

3. A system according to claim 1, wherein the fuel regulating means includes:
   premix combustion generating means for mixing the air and the gas fuel and for generating an air-fuel mixture to be supplied to the combustor such that a premix combustion is generated;
   diffusive combustion generating means for supplying the air and the gas fuel separately to the combustor such that a diffusive combustion is generated;
   operating condition detecting means for detecting operating condition of the engine; and
   combustion selecting means for selecting one of the premix combustion generating means and the diffusive combustion generating means based on the detected operating condition of the engine.

4. A system according to claim 1, wherein the calorific value calculating means includes:
   calorific value per unit air amount calculating means for calculating a calorific value per unit amount of the air based on the detected oxygen concentration;
   and determines the calorific value by multiplying the calorific value per unit amount of the air by the detected flow rate of the air.

5. A system according to claim 2, wherein the calorific value calculating means includes:
   calorific value per unit air amount calculating means for calculating a calorific value per unit amount of the air based on the detected oxygen concentration;
   and determines the calorific value by multiplying the calorific value per unit amount of the air by the detected flow rate of the air.

6. A system according to claim 1, wherein the fuel regulating means includes a feedback control loop having:
   desired calorific command value determining means for determining a desired calorific command value to be generated by the combustion based on the load;
   gas fuel flow rate controlling means for controlling the flow rate of the gas fuel based on the determined desired calorific command value;
   error calculating means for calculating an error between the determined desired calorific command value and the calculated calorific value; and
   desired calorific command value correcting means for correcting the determined desired calorific command value based on the calculated error.

7. A system according to claim 2, wherein the fuel regulating means includes a feedback control loop having:
   desired calorific command value determining means for determining a desired calorific command value to be generated by the combustion based on the load;
   gas fuel flow rate controlling means for controlling the flow rate of the gas fuel based on the determined desired calorific command value;
   error calculating means for calculating an error between the determined desired calorific command value and the calculated calorific value; and
   desired calorific command value correcting means for correcting the determined desired calorific command value based on the calculated error.

8. A system according to claim 6, wherein the gas fuel flow rate controlling means comprises a fuel control valve and includes;
   valve opening calculating means for calculating an opening of the fuel control valve in accordance with a predetermined characteristic preset relative to the desired calorific command value;
   and controls the flow rate of the gas fuel based on the determined opening of the valve.

9. A system according to claim 7, wherein the gas fuel flow rate controlling means comprises a fuel control valve and includes;
   valve opening calculating means for calculating an opening of the fuel control valve in accordance with a predetermined characteristic preset relative to the desired calorific command value;
   and controls the flow rate of the gas fuel based on the determined opening of the valve.

* * * * *